United States Patent [19]

Kawamura et al.

[11] 4,056,495

[45] Nov. 1, 1977

[54] HIGH SOLID ALKYD RESIN COATING COMPOSITION CURABLE AT AMBIENT TEMPERATURE

[75] Inventors: Masahumi Kawamura; Wataru Takahashi; Tadashi Watanabe, all of Hiratsuka, Japan

[73] Assignee: Kansai Paint Co., Ltd., Japan

[21] Appl. No.: 593,955

[22] Filed: July 8, 1975

[30] Foreign Application Priority Data

July 10, 1974 Japan .................................. 49-78831
July 10, 1974 Japan .................................. 49-78832

[51] Int. Cl.² .......................... C09D 3/64; C09D 3/66
[52] U.S. Cl. ........................... 260/22 CA; 260/22 CB; 260/23 P; 428/458
[58] Field of Search ............ 260/22 CA, 22 CB, 23 P

[56] References Cited

U.S. PATENT DOCUMENTS

| | | | |
|---|---|---|---|
| 2,933,475 | 4/1960 | Hoover et al. | 260/22 CA |
| 3,056,818 | 10/1962 | Werber | 260/22 CA |
| 3,258,475 | 6/1966 | Faulkner et al. | 260/22 CA |
| 3,578,619 | 5/1971 | Reeder | 260/448 B |
| 3,649,576 | 3/1972 | Stapfer | 260/22 CA |
| 3,793,359 | 2/1974 | Stapfer et al. | 260/429 J |
| 3,920,595 | 11/1975 | Anderson et al. | 260/22 CQ |
| 3,931,242 | 1/1976 | Dawans et al. | 260/429 J |
| 3,956,211 | 5/1976 | Muto et al. | 260/22 CA |

FOREIGN PATENT DOCUMENTS

| | | | |
|---|---|---|---|
| 807,680 | 3/1969 | Canada | 260/429 J |
| 740,251 | 11/1955 | United Kingdom | 260/22 CA |

*Primary Examiner*—Ronald W. Griffin
*Attorney, Agent, or Firm*—Ostrolenk, Faber, Gerb & Soffen

[57] ABSTRACT

A high solid coating composition curable at ambient temperature, causing no air pollution in use, which comprises the mixture of: (1) alkyd resin prepared from (a) saturated aliphatic or aromatic polybasic acids or their anhydrides, (b) polyhydric alcohols and (c) unsaturated vegetable oils or unsaturated vegetable oil fatty acids, and (II) metallic alcoholates and/or chelate compounds thereof. Some portion of said alkyd resin can be replaced by modified oils or butadiene polymers.

12 Claims, No Drawings

HIGH SOLID ALKYD RESIN COATING COMPOSITION CURABLE AT AMBIENT TEMPERATURE

BACKGROUND OF THE INVENTION

This invention relates to a coating composition curable at ambient temperature which contains a very small amount of organic solvent. More particularly, the invention relates to a high solid coating composition curable at ambient temperature which comprises unsaturated vegetable oil modified or unsaturated vegetable oil fatty acid modified alkyd resin having a low viscosity and curing accelerators of metallic alcoholates and/or chelate compounds thereof for the curing of inner portion of coating film. Furthermore, some portion of said alkyd resin of the present invention may be replaced by low molecular weight liquid polybutadiene polymer or modified oils.

The conventional coating compositions which can be dried at ambient temperature generally contain about 40% of organic solvents as thinners which become vapors when they are applied to the surfaces of several substrates and the vapors spread out in the air. Accordingly, the vapors of organic solvents detrimental to health cause public nuisance such as air pollution and they also cause serious losses in view of the saving of resources.

As the measures to solve these problems, there is a method to decrease the content of organic solvents in the coating composition. That is, for example, a coating composition containing much nonvolatile materials may be prepared by using low viscosity resins and nonvolatile low viscosity reactive thinners. However, when the coating composition prepared by this method is applied to form the coating film of, for example, more than 40 microns in dry thickness, shrive rings or wrinklings are caused to occur on the coated surface due to the use of the low molecular weight resins as low viscosity materials and to the small content of organic solvents. That is, since the content of organic solvent is small, the period after coating in which the coated surface comes in contact with the air becomes short, so that the curing in the surface portion of the coating film is faster than that in the inner portion of the coating film, and during the curing step, a considerable difference in the curing rate develops between the surface and the inner portion of the coating film.

Further, much more oxygen is required for the curing of the resin material because it is low in molecular weight, and the surface of the coating film which is in contact with the air is liable to absorb much more oxygen as compared with the inner portion of the coating film, and therefore a hard surface layer is formed in the coating film because the curing of the surface is caused to occur faster than that of inner portion. Accordingly, the diffusion of oxygen to the inner portion of the coating film is delayed and the curing of the inner portion is therefore hindered. For these reasons, surface defects such as wrinkling is formed when the conventional high solid coating composition is used to form the coating film of, for example, more than 40 microns in dry thickness, and what is worse, the inner portion of the coating film remains uncured for a week or more, and therefore the conventional high solid coating composition can not be successfully used. Furthermore, it is difficult to improve the curing of the inner protion of the coating film by using common organic metallic driers so as to be practically accepted.

BRIEF SUMMARY OF THE INVENTION

It is therefore a general object of the present invention to provide a novel high solid coating composition which is cured at ambient temperature.

It is another object of the present invention to provide a coating composition which does not form wrinklings or shriversings even when it is applied in higher thickness.

It is a further object of the present invention to provide a coating composition in which the curing of the inner portion of coating film is accelerated when it is applied to form a coating film.

It is still a further object of the present invention to provide a coating composition which hardly cuases air pollution and loss of solvent.

Pursuant to the above objects, the inventors of the present application have carried out eager and extensive studies and experiments and as the result, an improved high solid coating composition has been invented. According to the invention, the coating composition comprises 100 parts by weight of alkyd resin or the mixture of said resin and polybutadiene or modified oil, and 1 to 10 parts by weight of metallic alcoholates and/or chelate compound thereof. Because of the addition of the metallic alcoholates and/or chelate compounds thereof, the curing property in the inner portion of coating film can be accelerated to a great extent so that the wrinkling can be prevented and other various properties of the coating film can also be improved. In other words, when coating film of, for example, more than 40 microns in dry thickness is formed by using a coating composition without the above-mentioned metallic alcoholates and/or chelate compounds thereof, wrinklings are caused to occur, however, when the coating composition containing the metallic alcoholates and/or chelate compounds thereof is used to form coating films of, for example, more than 150 microns in dry thickness, excellent coating films without any wrinklings can be obtained.

DETAILED DESCRIPTION OF THE INVENTION

The high solid and low viscosity alkyd resin used in the present invention is the reaction product of (a) saturated aliphatic or aromatic polybasic acids or their acid anhydrides, (b) polyhydric alcohols and (c) unsaturated vegetable oils or unsaturated vegetable oil fatty acids. Further, the alkyd resin has the following characteristics: (1) oil length: not less than 65%, (2) resin acid value: not more than 7, ( b 3) viscosity (Gardner-Holdt/25° C): Z or less, and (4) solid content: not less than 90%. Applicable saturated aliphatic polybasic acids and anhydrides thereof mentioned in the above are exemplified by adipic acid, sebacic acid, azelaic acid, succinic acid, succinic anhydride and dodecylsuccinic anhydride, which are used either alone or in combination.

Further, as the above-mentioned aromatic polybasic acids and anhydrides thereof, one member or a mixture of phthalic acid, phthalic anhydride, isophthalic acid, dimethylterephthalic acid, terephthalic acid, tetrahydrophthalic anhydride, hexahydrophthalic anhydride and endomethylene tetrahydrophthalic anhydride can be used. Further, the abovementioned polyhydric alcohols are exemplified by ethylene glycol, diethylene glycol, triethylene glycol, propylene glycol, neopentyl glycol, 1,2-butylene glycol, 1,3-butylene glycol, 2,3-butylene glycol, 1,4-butylene glycol, 1,6-hexanediol, isopentyl glycol, trimethylolethane, trimethylolpropane, pentaerythritol, dipentaerythritol, glycerol, Cardura E (trademark, glycidyl ester of synthetic tertiary carboxylic acid, made by Shell Chemical Co., Japan) diethylene glycol ethyl ether and diglycerol, which are used either solely or in combination.

The above-mentioned unsaturated vegetable oils and unsaturated vegetable oil fatty acids used for the composition of the present invention are exemplified by one member or more of linseed oil, safflower oil, soybean oil, dehydrated castor oil, tung oil, cotton seed oil, sunflower oil, their fatty acids, tall oil fatty acid, Hidiene Fatty Acid (trademark, conjugated fatty acid comprising mainly linolic acid, made by Soken Chemical Co., Japan) and Pamolyn (trademark, conjugated fatty acid comprising mainly linolic acid, made by Hercules Inc. U.S.A.). It is to be noted that the raw materials for the coating composition of the present invention are not restricted to the above-mentioned materials.

The nonvolatile low viscosity reactive thinner used in the present invention is homopolymers of butadiene, copolymers of butadiene with other copolymerizable monomers or their mixture (hereinafter referred to as "butadiene-type polymer") with or without functional groups such as carboxyl group and hydroxyl group and having a number average molecular weight of 800 to 2,500, and more than 50% of the butadiene units forming the main chain structure of said butadiene-type polymer consists of 1,2-butadiene or 1,4-butadiene. The monomers to be copolymerized with butadiene include, for example, olefins having 2 to 6 carbon atoms; dienes such as isoprene, chloroprene, cyclopentadiene, etc; acrylic acid, methacrylic acid and alkyl ($C_1$ to $C_{16}$) esters thereof; styrene compounds such as styrene, α-methyl styrene, vinyl toluene, etc.; and acrylonitrile and methacrylonitrile. Further, the modified oils for the coating composition of the present invention may be exemplified by boiled oil, stand oil, maleinated oil and styrenated oil which are prepared by treating the above unsaturated vegetable oils thermally or chemically, and these oils must have sufficient oil length not less than 70%. The above-mentioned butadiene-type polymer and modified oils can be used as a mixture. When the nonvolatile reactive thinner which becomes a constituent part of the cured coating film is used together with the above-mentioned alkyd resin, 10 to 50% by weight of the former reactive thinner is mixed with 90 to 50% by weight of the latter alkyd resin.

The above-mentioned metallic alcoholates may be exemplified by aluminum triisopropylate, mono-sec-butoxy aluminum diisopropylate, aluminum tri-sec-butylate, titanium triisopropylate, mono-sec-butoxy titanium diisopropylate, titanium tri-sec-butylate, aluminum tripentalate, aluminum trihexalate, titanium tripentalate and titanium trihexalate. Further, the chelate compounds may be exemplified by methylacetoacetate aluminum diisopropylate, ethylacetoacetate aluminum diisopropylate, methylacetoacetate titanium diisopropylate, ethylacetoacetate titanium diisopropylate, aluminum tris(methylacetoacetate), aluminum tris(ethylacetoacetate), titanium tris(methylacetoacetate), titanium tris(ethylacetoacetate), diethylmalonate aluminum diisopropylate, dimethylmalonate aluminum diisopropylate, diethylmalonate titanium diisopropylate, dimethylmalonate titanium diisopropylate, aluminum tris(acetylacetone) and titanium tris(acetylacetone). In like manner as the foregoing materials, the above alcoholates and/or chelate compounds thereof may also be used either alone or in combination.

The amount of use of the metallic alcoholates and/or chelate compounds thereof are from 0.5 to 15 parts by weight, preferably 1 to 10 parts by weight to 100 parts by weight of the alkyd resin or the mixture of alkyd resin and nonvolatile reactive thinner. When the amount of metallic alcoholate and/or chelate compound thereof is less than 0.5 part by weight, a sufficient effect for accelerating the curing of the inner portion of the coating film can not be expected, and therefore the wrinkling can not be prevented. On the other hand, when more than 15 parts by weight of the metallic alcoholates and/or chelate compounds are added, the storage stability of the coating composition is impaired and what is worse, water resistance and other film properties are degraded.

In the present invention, the above-mentioned metallic alcoholates and/or chelate compounds are added. Therefore the curing in the inner portion of the coating film can be accelerated and thus the curing rates in the inner and surface portions of the coating film can be balanced.

Further, when the metallic alcoholates and/or chelate compounds thereof are added, the lowering of storage stability is generally apprehended, however, it is not necessary to have such apprehension in the present invention because the viscosity of the coating composition hardly increases during the storage, for example, for one month at 40° C.

Furthermore, another advantage owing to the addition of metallic alcoholates and/or chelate compounds thereof to the coating composition of the present invention is that several film properties are improved by the increase of the internal curing property.

Firstly, the recoatability can be improved. When an additional coating is applied on a coating film having low recoatability, the under coating is liable to be softened by the solvent of the over coating, and therefore the wrinklings are formed on the surface. However, when the coating composition containing the metallic alcoholates and/or chelate compounds thereof is used, the recoating is possible even 6 hours after the coating due to the fact that the inner portion of the coating film is well cured and the coating composition of the present invention contain a very small quantity of solvent.

The second advantage is the improvement of the film hardenss, adherence and other physical properties, which are also the results of the acceleration of curing in the inner portion of the coating film.

The third advantage is the increase of film thickness. The coating composition of the present invention is prepared from low molecular weight polymers as vehicle resins so that the uncured composition is liable to cause running. However, the composition of the present invention is mixed with the above-mentioned metallic alocholates and/or chelate compounds, thereof, and therefore the critical thickness against running can be increased to about 1.5 to 2 times as much as the composition which does not contain them.

Still further, according to the present invention, about 50 to 400 parts by weight of pigments can be added to 100 parts by weight of the above-mentioned alkyd resin or the mixture of alkyd resin and nonvolatile reactive thinners. Further, organic solvents may be added to the mixture in such an amount that the pigments can be dispersed in conventional manner. If necessary, other additives may be added to the above mixture. The obtained coating composition of the present invention has a viscosity of 70 KU (Krebs Stormer Viscometer, 25° C) and a solid content of more than 80% (generally 85 to 95%). Comparing the contents of organic solvents, when the pigment content is 100 parts by weight (against 100 parts by weight of resin) in the conventional coating composition having a viscosity of 70 KU (Krebs Stormer Viscometer, 25° C), the solid content is about 60% at most. In the coating composition of the present invention, the solid content is more than 80%. In other words, the solid content of about 60% in the conventional coating composition means that about 67 parts by weight of organic solvent is contained against 100 parts b weight of solid. In the coating composition of the present invention containing at least 80% of solid, the content of organic solvent is 25 parts by weight to 100 parts by weight of solid.

Accordingly, the content of organic solvent in the coating composition of the present invention is about one third that of the conventional composition, calculated from the above values of 25 parts and 67 parts by weight. Further, in case of the most common composition in the present invention having the solid content of 90%, the quantity of organic solvent becomes about 11 parts by weight to 100 parts by weight of solid which is one sixth that of as the conventional composition. Therefore, with a view to the prevention of air pollution and saving of resources, the coating composition of the present invention is of great significance.

In order that those skilled in the art may better understand the present invention and the manner in which it may be practised, the following specific examples are given as merely illustrative ones, in which parts and % are by weight unless otherwise indicated.

EXAMPLE 1

A 5 liter four-neck round bottom flask equipped with a thermometer, stirrer, reflux condenser, water separator and nitrogen gas introducing pipe, was fed with 750.0 parts of linseed oil and 100.7 parts of pentaerythritol. The air in the flask was replaced by nirogen gas and the contents were heated to 230° C with stirring. Then, 0.75 part of litharge was added at that temperature and the contents were further heated to 240° C and maintained at this temperature for 30 minutes. The contents were thereafter cooled to 200° C and 170.0 parts of phthalic anhydride, 50 parts of mineral spirit and a very small amount of defoaming agent were added. Then, the mixture was allowed to react for 6 hours at 240° C to obtain an alkyd resin varnish of 1.8 acid value and U-V in viscosity. The solid content of this varnish was 95.4%.

EXAMPLE 2

By using safflower oil in place of the linseed oil in Example 1, the reaction proceeded in like manner as Example 1 to obtain an alkyd resin varnish of 1.7 in acid value and U-V in viscosity. The solid content of this varnish was 95.0%.

EXAMPLE 3

The same 5 liter four-neck round bottom flask as that used in Example 1 was fed with 717.5 parts of linseed oil fatty acid, 170.0 parts of phthalic anhydride, 100.7 parts of pentaerythritol 87.7 parts of glycerol, 50.0 parts of mineral spirit and a very small amount of defoaming agent. The air in the flask was replaced by nitriogen gas and the mixture in the flask was heated to 180° C, and maintained for 1 hour at this temperature. Thereafter the temperature was raised to 240° C and the contents were allowed to react for 7.5 hours to obtain an alkyd resin varnish of 4.2 in acid value and W in viscosity. The solid content of this varnish was 95.2%.

EXAMPLE 4

The reaction was carried out in like manner as the foregoing Example 3 except that safflower oil fatty acid was used in place of the linseed oil fatty acid in Example 3, and another alkyd resin varnish of 4.0 in acid value and V-W in viscosity was obtained. The solid content of this product was 95.3%.

Coating Examples 1 to 4

To each 105 parts of the long-oil alkyd resin varnish prepared in Examples 1 to 4 were added 83 parts of titanium dioxide, 13 parts of calcium carbonate, 0.6 part of cobalt naphthenate, 1.0 part of manganese naphthenate, 3.3 parts of lead naphthenate, 4.2 parts of zirconium naphthenate, 0.83 part of a mixture of lanthanum naphthenate and cerium naphthenate (hereinafter referred to as rare-earth naphthenate) and a small amount of mineral spirit (so as to adjust the visocity suitable for dispersing the pigments) to obtain the coating Examples 1 to 4. The pigments in the above mixtures were dispersed for about 45 minutes by using a shaker. Then, acetylacetone-aluminum chelate compound, "ALM-I"(trademark, made by The Nippon Synthetic Chemical Industry Co., Ltd.) was added to each of the above obtained coating compositions and diluted with mineral spirit to adjust the viscosity to 70 KU. The obtained coating compositions were coated on mild steel sheets and the coated sheets were subjected to tests. The results of the tests are shown in the following Table I and II.

Table I

| Alkyd Resin Varnish | Chelate Compound ALM-I (%) | Solid Content at 70KU Viscosity (%) | Film Thickness at Which Wrinklings Began to Occur ($\mu$) | Recoatability 6 hours after coating | Critical Thickness against Running ($\mu$) (*1) |
|---|---|---|---|---|---|
| Coating Ecample 1 | 0 | 89.2 | Wrinklings at 43 $\mu$ or more | Not good at 40$\mu$ | 50 |
|  | 5 | 89.0 | No wrinklings at 125 $\mu$ | Good at 125 $\mu$ | 90 |
| Coating Example 2 | 0 | 90.0 | Wrinklings at 44 $\mu$ or more | Not good at 41 $\mu$ | 48 |
|  | 5 | 89.8 | No wrinklings at 130 $\mu$ | Good at 126 $\mu$ | 102 |
| Coating Example 3 | 0 | 90.1 | Wrinklings at 43 $\mu$ or more | Not good at 39 $\mu$ | 51 |
|  | 5 | 90.2 | No wrinklings at 130 $\mu$ | Good at 130 $\mu$ | 105 |
| Coating Example 4 | 0 | 90.9 | Wrinklings at 41 $\mu$ or more | Not good at 43 $\mu$ | 60 |

Table I-continued

| Alkyd Resin Varnish | Chelate Compound ALM-I (%) | Solid Content at 70KU Viscosity (%) | Film Thickness at Which Wrinklings Began to Occur ($\mu$) | Recoatability 6 hours after coating | Critical Thickness against Running ($\mu$) (*1) |
|---|---|---|---|---|---|
|  | 5 | 90.7 | No wrinklings at 135 $\mu$ | Good at 125 $\mu$ | 91 |
| SD FORCE (*2) | 0 | 61.7 | No wrinklings at 100 $\mu$ | Good at 100 $\mu$ | 100 |

Notes on Table I
(*1) The viscosity of test sample was adjusted to 65 ± 1 KU, the sample was then applied to the surface of a glass plate by using a tester for testing the critical thickness against running (made by Fujimoto Co., Ltd. Japan) and the coated sample was allowed to stand at an angle of 45°. By the way, "SD·FORCE" is a conventional solvent type paint curable at ambient temperature and contains running inhibitor, so that the chelate compound "ALM-I" was not added in the above example.
(*2) Trade mark, Solvent type paint curable at ambient temperature made by Kansai Paint Co., Ltd.

Table II

| Alkyd Resin Varnish | Chelate Compound ALM-I (%) | Drying Time (hr-min) | Pencil Hardness | Adhesion (to mild steel sheet) | Erichsen Film Test (mm) | Gloss(60°) | Du Pont Impact Test Back Side | Du Pont Impact Test Front Side |
|---|---|---|---|---|---|---|---|---|
| Coating Example 1 | 0 | 5 – 40 | 4B | 100/100 | 5 | 93 | 500g × 45cm | 1kg × 50cm< |
|  | 5 | 5 – 30 | B | 100/100 | 7< | 90 | 1kg × 50cm< | 1kg × 50cm< |
| Coating Example 2 | 0 | 5 – 10 | 3B | 100/100 | 7< | 92 | 500g × 30cm | 1kg × 20cm |
|  | 5 | 5 – 10 | B | 100/100 | 7< | 92 | 1kg × 50cm< | 1kg × 50cm< |
| Coating Example 3 | 0 | 5 – 30 | 4B | 100/100 | 6 | 90 | 500g × 40cm | 1kg × 10cm |
|  | 5 | 5 – 20 | B+ | 100/100 | 7 | 91 | 1kg × 50cm< | 1kg × 50cm< |
| Coating Example 4 | 0 | 5 – 10 | 3B | 100/100 | 7 | 93 | 500g × 45cm | 1kg × 20cm |
|  | 5 | 5 – 20 | HB | 100/100 | 7< | 94 | 1kg × 50cm< | 1kg × 50cm< |
| SD FORCE | 0 | 5 – 20 | 2B | 100/100 | 7< | 90 | 500g × 45cm | 500g × 35cm |

Note:
The samples were tested after 7 days' drying in 75% relative humidity at 25° C.

COATING EXAMPLES 5 TO 8

The tests were carried out in like manner as the foregoing Coating Example 1 to 4 except that a mixture or 74 parts of long oil alkyd resin varnish prepared in Examples 1 to 4 and 30 parts of "LPB-800" (trademark of 1,2-polybutadiene having a number of average molecular weight of 825 and a viscosity of 575 centipoise made by Nippon Soda Co., Ltd.) was used in place of each 105 parts of the long oil alkyd resin varnish.

The results of the tests are shown in the following Tables III and IV.

Table III

| Alkyd Resin Varnish | Chelate Compound ALM-I (%) | Solid Content at 70KU Viscosity (%) | Film Thickness at which Wrinklings Began to Occur ($\mu$) | Recoatability (6 hours after coating) | Critical Thickness against Running ($\mu$) |
|---|---|---|---|---|---|
| Coating Example 5 | 0 | 92.9 | Wrinklings at 39 $\mu$ or more | Not good at 37 $\mu$ | 47 |
|  | 5 | 92.5 | No Wrinklings at 120 $\mu$ | Good at 120 $\mu$ | 92 |
| Coating Example 6 | 0 | 3.1 | Wrinklings at 35 $\mu$ or more | Not good at 40 $\mu$ | 41 |
|  | 5 | 93.0 | No wrinklings at 132 $\mu$ | Good at 131 $\mu$ | 100 |
| Coating Example 7 | 0 | 92.6 | Wrinklings at 37 $\mu$ or more | Not good at 39 $\mu$ | 45 |
|  | 5 | 92.0 | No wrinklings at 130 $\mu$ | Good at 125 $\mu$ | 97 |
| Coating Example 8 | 0 | 92.0 | Wrinklings at 34 $\mu$ or more | Not good at 40 $\mu$ | 57 |
|  | 5 | 91.9 | No wrinklings at 127 $\mu$ | Good at 121 $\mu$ | 102 |
| SD FORCE | 0 | 61.7 | No wrinklings at 100 $\mu$ | Good at 130 $\mu$ | 100 |

Table IV

| Alkyd Resin Varnish | Chelate Compound ALM-I (%) | Drying Time (hr-min) | Pencil Hardness | Adhesion to mild steel sheet | Erichsen Film Test (mm) | gloss(60°) | Du Pont Impact Test Back Side | Du Pont Impact Test Front Side |
|---|---|---|---|---|---|---|---|---|
| Coating Example 5 | 0 | 6 – 40 | 2B | Good | 8 | 92 | 1kg × 45 cm | 1kg × 20 cm |
|  | 5 | 6 – 50 | B | Good | 8< | 90 | 1kg × 50 cm< | 1kg × 50 cm< |
| Coating Example 6 | 0 | 6 – 50 | 2B | Good | 8 | 91 | 1kg × 20 cm | 1kg × 25 cm |
|  | 5 | 6 – 50 | B | Good | 8< | 92 | 1kg × 50 cm< | 1kg × 50 cm< |
| Coating Example 7 | 0 | 7 – 00 | 2B | Good | 7 | 90 | 1kg × 10 cm | 1kg × 20 cm |
|  | 5 | 7 – 00 | B | Good | 8< | 90 | 1kg × 50 cm< | 1kg × 50 cm< |
| Example 8 | 0 | 7 – 10 | 2B | Good | 8 | 92 | 1kg × 10 cm | 1kg × 10 cm |
|  | 5 | 7 – 10 | B | Good | 8< | 92 | 1kg × 50 cm< | 1kg × 50 cm< |

Table IV-continued

| Alkyd Resin Varnish | Chelate Compound ALM-I (%) | Drying Time (hr-min) | Pencil Hardness | Adhesion to mild steel sheet | Erichsen Film Test (mm) | gloss(60°) | Du Pont Impact Test Back Side | Du Pont Impact Test Front Side |
|---|---|---|---|---|---|---|---|---|
| SD FORCE | 0 | 5 – 20 | B | Good | 8< | 90 | 500g × 45 cm | 500g × 150 cm |

Note:
Samples were tested after 7 days' drying in 75 % relative humidity at 25° C.

COATING EXAMPLES 9 TO 12

Tests were carried out in like manner as the foregoing Coating Examples 1 to 4 except that a mixture of 74 parts of each long oil alkyd resin varnish prepared in Examples 1 to 4 and 30 parts of "SL-6" (trademark of modified vegetable oil made by The Nisshin Oil Mills, Ltd.) was used in place of each 105 parts of the long oil alkyd resin.

The test results thereof are shown in the following Tables V and VI.

REFERENCE EXAMPLE 1

Coating compositions were prepared, in like manner as the foregoing Coating Examples 1 to 4, by dispersing the pigments and other materials into each 105 parts of the long oil alkyd resin varnish prepared in Example 2, in which the organometallic driers indicated in the following Table VII were used in place of those in Coating Examples 1 to 4. The compositions were then subjected to the tests of gel fraction, film thickness at which wrinkling begins to occur and recoatability in order to examine the internal curing properties.

The results of tests are shown in the following Table VII.

Table V

| Alkyd Resin Varnish | Chelate Compound ALM-I (%) | Solid Content at 70 KU Viscosity (%) | Film Thickness at which Wrinklings Began to Occur (μ) | Recoatability 6 hours after coating | Critical Thickness against Running (μ) |
|---|---|---|---|---|---|
| Coating Example 9 | 0 | 92.0 | Wrinklings at 41 μ or more | Not good at 37 μ | 45 |
|  | 5 | 91.8 | No wrinklings at 125 μ | Good at 120 μ | 91 |
| Coating Example 10 | 0 | 92.5 | Wrinklings at 40 μ or more | Not good at 40 μ | 37 |
|  | 5 | 92.6 | No wrinklings at 130 μ | Good at 135 μ | 90 |
| Coating Example 11 | 0 | 92.3 | Wrinklings at 38 μ or more | Not good at 42 μ | 42 |
|  | 5 | 91.9 | No wrinklings at 132 μ | Good at 130 μ | 100 |
| Coating Example 12 | 0 | 92.7 | Wrinklings at 41 μ or more | Not good at 41 μ | 46 |
|  | 5 | 92.5 | No wrinklings at 122 μ | Good at 135 μ | 105 |
| SD FORCE | 0 | 61.7 | No wrinklings at 100 μ | Good at 100 μ | 100 |

Table VI

| Alkyd Resin Varnish | Chelate Compound ALM-I (%) | Drying Time (hr-min) | Pencil Hardness | Adhesion to mild steel sheet | Erichsen Film Test (mm) | Gloss (60° C) | Du Pont Impact Test Back Side | Du Pont Impact Test Front Side |
|---|---|---|---|---|---|---|---|---|
| Coating Example 9 | 0 | 6 – 00 | 2B | Good | 8< | 91 | 1kg × 45cm | 1kg × 20cm |
|  | 5 | 6 – 10 | B | Good | 8< | 92 | 1kg × 50cm< | 1kg × 50cm< |
| Coating Example 10 | 0 | 6 – 20 | 2B | Good | 7 | 90 | 1kg × 20cm | 1kg × 30cm |
|  | 5 | 6 – 20 | B | Good | 8< | 93 | 1kg × 50cm< | 1kg × 50cm< |
| Coating Example 11 | 0 | 6 – 10 | 2B | Good | 8 | 91 | 1kg × 15cm | 1kg × 10cm |
|  | 5 | 6 – 00 | B | Good | 8< | 94 | 1kg × 50cm< | 1kg × 50cm< |
| Coating Example 12 | 0 | 6 – 20 | 2B | Good | 8 | 92 | 1kg × 10cm | 1kg × 20cm |
|  | 5 | 6 – 30 | B | Good | 8< | 90 | 1kg × 50cm< | 1kg × 50cm< |
| SD FORCE | 0 | 5 – 30 | B | Good | 8< | 91 | 500g × 45cm< | 500g × 50cm< |

Table VII

| Test Number | Organometallic Drier Name | Parts 100 parts resin | Gel Fraction (%) | Film Thickness at Which Wrinklings Began to Occur (μ) | Recoatability 6 hours after coating |
|---|---|---|---|---|---|
| 1 | Cobalt naphthenate<br>Manganese naphthenate<br>Lead naphthenate | 0.05<br>0.05<br>1.0 | 65.5 | Wrinklings at 45 μ or more | Not good at 41 μ |
| 2 | Cobalt naphthenate<br>Lead naphthenate | 0.0<br>0.5 | 66.0 | Wrinklings at 42 μ or more | Not good at 42 μ |
| 3 | Cobalt naphthenate<br>Manganese naphthenate<br>Lead naphthenate<br>Calcium naphthenate | 0.05<br>0.05<br>0.5<br>0.5 | 63.2 | Wrinklings at 41 μ or more | Not good at 40 μ |
| 4 | Cobalt naphthenate<br>Manganese naphthenate | 0.05<br>0.05 | 66.2 | Wrinklings at 41 μ or more | Not good at 42 μ |

Table VII-continued

| Test Number | Organometallic Drier Name | Parts 100 parts resin | Gel Fraction (%) | Film Thickness at Which Wrinklings Began to Occur (μ) | Recoatability (6 hours after coating) |
|---|---|---|---|---|---|
| 5 | Lead naphthenate<br>Zirconium naphthenate<br>Cobalt naphthenate<br>Manganese naphthenate | 0.5<br>0.5<br>0.05<br>0.05 | 64.3 | Wrinklings at 43 μ or more | Not good at 41 μ |
| 6 | Lead naphthenate<br>Zinc naphthenate<br>Cobalt naphthenate<br>Manganese naphthenate | 0.5<br>0.5<br>0.05<br>0.05 | 66.1 | Wrinklings at 46 μ or more | Not good at 42 μ |
| 7 | Lead naphthenate<br>Rare earth naphthenate<br>The same as Coating Example 1 to 4 (contains chelate compound "ALM-I") | 0.5<br>0.05 | 76.3 | No wrinklings at 130 μ | Good at 126 μ |

REFERENCE EXAMPLE 2

Other coating compositions were prepared, in like manner as the foregoing Coating Examples 5 to 8, by dispersing the pigments and other materials into the mixture of 74 parts of the long oil alkyd resin varnish prepared in Example 2 and 30 parts of the afore-mentioned "SL-6", in which the organometallic driers indicated in the following Table VIII were used in place of those in Examples 5 to 8. The compositions were subjected to the tests of gel fraction, film thickness at which wrinkling begins to occur and recoatability in order to examine the internal curing properties.

The results of the tests are shown in the following Table VIII.

Table VIII

| Test Number | Organometallic Drier Name | parts 100 parts resin | Gel Fraction (%) | Film Thickness at Which Wrinklings Began to Occur (μ) | Recoatability (6 hours after coating) |
|---|---|---|---|---|---|
| 1 | Cobalt naphthenate<br>Manganese naphthenate | 0.05<br>0.05 | 67.0 | Wrinklings at 44 μ or more | Not good at 39 μ |
| 2 | Lead naphthenate<br>Cobalt naphthenate | 1.0<br>0.05 | 67.2 | Wrinklings at 42 μ or more | Not good at 40 μ |
| 3 | Lead naphthenate<br>Cobalt naphthenate<br>Manganese naphthenate | 0.5<br>0.05<br>0.05 | 65.0 | Wrinklings at 41 μ or more | Not good at 38 μ |
| 4 | Lead naphthenate<br>Calcium naphthenate<br>Cobalt naphthenate<br>Manganese naphthenate | 0.5<br>0.5<br>0.05<br>0.05 | 66.0 | Wrinklings at 39 μ or more | Not good at 42 μp |
| 5 | Lead naphthenate<br>Zirconium naphthenate<br>Cobalt naphthenate<br>Manganese naphthenate | 0.5<br>0.5<br>0.05<br>0.05 | 65.5 | Wrinklings at 40 μ or more | Not good at 37 μ |
| 6 | Lead naphthenate<br>Zinc naphthenate<br>Cobalt naphthenate<br>Manganese naphthenate | 0.5<br>0.5<br>0.05<br>0.05 | 64.1 | Wrinklings at 43 μ or more | Not good at 40 μ |
| 7 | Lead naphthenate<br>Rare earth naphthenate<br>The same as Coating Examples 5 to 8 (contains chelate compound, ALM-I) | 0.5<br>0.05 | 78.2 | No wrinklings at 130 μ | Good at 125 μ |

It will be understood from the foregoing disclosure that the coating composition of the present invention is very useful for a wide variety of industrial purposes. It should be emphasized, however, that the specific embodiments described and shown in the foregoing examples are intended as merely illustrative and in no way restrictive or the invention.

The testing methods are as follows:
1. Pencil hardness
   JIS. K-5400.6.14
2. Adhesion After leaving a test plate to stand in a constant temperature and constant humidity chamber at a temperature of 20 ± 1° C and a humidity of 75% for 1 hour, make eleven parallel cuts, 1 mm apart, in the coating film up to the surface of substrate, using a single-edged razor blade. Make a similar set of cuts at right angles to the first cut to form 100 squares. Using an Erichsen film tester, push out the test panel 5 mm and apply a piece of cellophane adhesive tape to the pushed out portion. Press the tape firmly from above and thereafter remove the tape rapidly. The evaluation is expressed by a fraction in which the denominator is the number of squares formed and the numerator is the number of squares left unremoved. Thus 100/100 indicates that the coating remain completely unremoved.

3. Erichsen film test

The coating plate is placed in a constant temperature and humidity chamber kept at 20° C and humidity of 75% for one hour. Thereafter, the plate is set on Erichsen testing machine with the coating positioned outside. A punch having a radius of 10 mm is pushed outward predetermined distance in contact with the rear face of the plate at as uniform speed as possible of about 0.1 mm/sec. The pushed out portion of the plate is checked by the naked eye for cracking or peeling immediately after pushing out to determine the maximum distance (mm) of stroke of the punch causing no changes on the coating.

4. Glass
   JIS K-5400.6.7.
5. Impact resistance

After leaving a coated plate to stand in a constant temperature and constant humidity chamber at a temperature of 20° ± 1° C and a humidity of 75% for 1 hour, the following test is conducted in the same chamber. A bearer and a center of impact of prescribed size one-half inch) are fitted to a Du Pont impact tester and the plate is put between them, turning the coated surface of the plate upward. The prescribed weight is dropped on the center of impact from the prescribed height and the plate is taken out, and after having been left for an hour in the room, the damage of surface is observed. The largest height (cm) of the weight entailing no cracking in the coating is determined.

6. Gel fraction

The coating film was peeled off the plate and immersed in acetone to extract acetone-soluble contents under the boiling point of acetone. The resulting residue was then dried at a reduced pressure. Gel fraction was calculated from the result according to the following equation Gel fraction (%)
$= \frac{\text{Weight (g) of film after extraction in acetone}}{\text{Weight (g) of film prior to extraction in acetone}} \times 100$

What is claimed is:

1. A high solid coating composition curable at ambient temperatures and characterized by a solid content of at least 80% at 70 KU viscosity which comprises the mixture of:
   I. 100 parts by weight of alkyd resin having an oil length of not less than 65%, resin acid value of not more than 7, Gardner-Holdt viscosity (25° C) of not more than Z and solid content of not less than 90% which is prepared by the reaction among (a) saturated aliphatic or aromatic polybasic acids or their acid anhydrides, (b) polyhydric alcohols, and (c) unsaturated vegetable oils or unsaturated vegetable oil fatty acids, and
   II. 1 to 10 parts by weight of at least one aluminum alcoholate or chelate thereof.

2. A coating composition as claimed in claim 1, in which 10 to 50% by weight of said alkyd resin (I) is replaced by modified oils having oil length of not less than 70% or butadiene homopolymers or copolymers with or without functional groups, said butadiene homopolymers or copolymers having number average molecular weight of 800 to 2,500 and more than 50% of the butadiene units of the main chains thereof being 1,2-bonds or 1,4-bonds.

3. A coating composition as claimed in claim 1 in which 50 to 400 parts by weight of pigments to 100 parts by weight of said alkyd resin and a small amount of organic solvent are added.

4. A coating composition as claimed in claim 1 in which said saturated aliphatic polybasic acids or their acid anhydrides are at least one member selected from the group consisting of adipic acid, sebacic acid, azelaic acid, succinic acid, succinic anhydride and dodecylsuccinic anhydride.

5. A coating composition as claimed in claim 1 in which said aromatic polybasic acids or their acid anhydrides are at least one member selected from the group consisting of phthalic acid, phthalic anhydride, isophthalic acid, dimethylterephthalic acid, terephthalic acid, tetrahydrophthalic anhydride, hexahydrophthalic acid, tetrahydrophthalic anhydride, hexahydrophthalic anhydride and endomethylene tetrahydrophthalic anhydride.

6. A coating composition as claimed in claim 1 in which said polyhydric alcohols are at least one member selected from the group consisting of ethylene glycol, diethylene glycol, triethylene glycol, propylene glycol, neopentyl glycol, 1,2-butylene glycol, 1,3-butylene glycol, 2,3-butylene glycol, 1,4-butylene glycol, 1,6-hexanediol, isopentyl glycol, trimethylolethane, trimethylolpropane, pentaerythritol, dipentaerythritol, glycerol, glycidyl ester of synthetic tertiary carboxylic acid, diethylene glycol ethyl ether and diglycerol.

7. A coating composition as claimed in claim 1 in which said unsaturated vegetable oils and unsaturated vegetable oil fatty acids are at least one member selected from the group consisting of linseed oil, safflower oil, soybean oil, dehydrated castor oil, tung oil, cotton seed oil, sunflower oil, their fatty acids, tall oil fatty acid, and conjugated fatty acid.

8. A coating composition as claimed in claim 1 in which said (II) conponent is at least one alcoholate selected from the group consisting of aluminum triisopropylate, mono-sec-butoxy aluminum diisopropylate, aluminum tri-sec-butylate, aluminum tripentalate, and aluminum trihexalate.

9. A coating composition as claimed in claim 1 in which said (II) component is at least one chelate selected from the group consisting of methylacetoacetate aluminum diisopropylate, ethylacetoacetate aluminum diisopropylate, aluminum tris(ethylacetoacetate), aluminum tris(methylacetoacetate), diethylmalonate aluminum diisopropylate, dimethylmalonate aluminum diisopropylate, and aluminum tris(acetylacetone).

10. A coating composition as claimed in claim 2, in which said modified oils are at least one member selected from the group consisting of boiling oil, stand oil, maleinated oil and styrenated oil.

11. A coating composition as claimed in claim 1 wherein said alkyd resin is of ingredients consisting essentially of phthalic anhydride, pentaerythritol and a vegetable oil selected from the group consisting of linseed oil and safflower oil, and wherein said alkyd has a resin acid value of 1.7 to 1.8 and a solid content of 95% to 95.4%.

12. A coating composition as claimed in claim 1 wherein said alkyd is of ingredients consisting essentially of phthalic anhydride, pentaerythritol, glycerol, and a fatty acid selected from the group consisting of linseed oil fatty acid and safflower oil fatty acid, and wherein said alkyd has a resin acid value of 4 to 4.2 and a solid content of 95.2 to 95.3%.

* * * * *